(No Model.) 2 Sheets—Sheet 1.
L. C. DALTON & G. C. MYATT.
ADDING MACHINE.
No. 509,722. Patented Nov. 28, 1893.
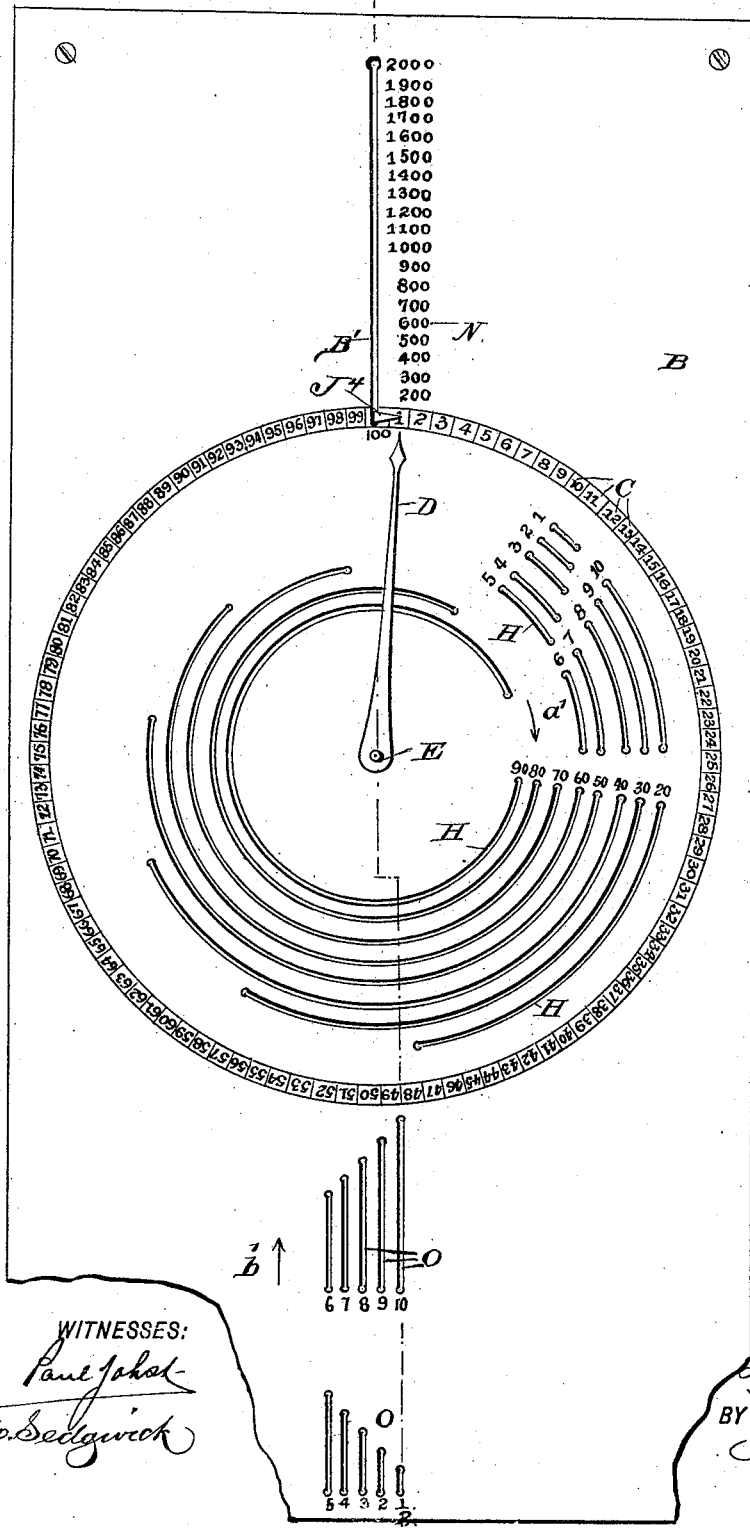
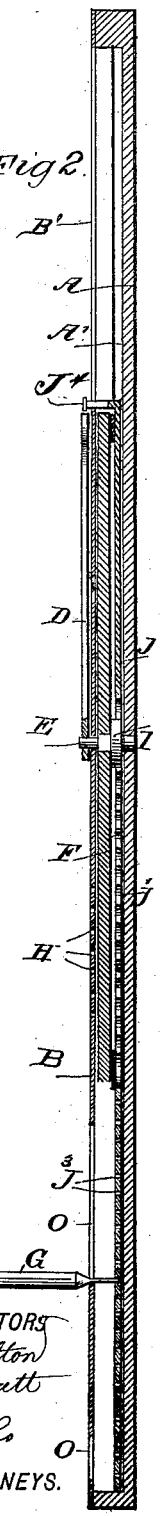
WITNESSES:
Paul Johol
C. Sedgwick
INVENTORS
L. C. Dalton
G. C. Myatt
BY Munn & Co.
ATTORNEYS.

(No Model.) 2 Sheets—Sheet 2.

L. C. DALTON & G. C. MYATT.
ADDING MACHINE.

No. 509,722. Patented Nov. 28, 1893.

WITNESSES:

INVENTORS
L. C. Dalton
G. C. Myatt
BY Munn & Co.
ATTORNEYS.

UNITED STATES PATENT OFFICE.

LEVI C. DALTON AND GEORGE C. MYATT, OF PONDER, MISSOURI.

ADDING-MACHINE.

SPECIFICATION forming part of Letters Patent No. 509,722, dated November 28, 1893.

Application filed February 8, 1893. Serial No. 461,545. (No model.)

*To all whom it may concern:*

Be it known that we, LEVI C. DALTON and GEORGE C. MYATT, of Ponder, in the county of Ripley and State of Missouri, have invented a new and Improved Adding-Machine, of which the following is a full, clear, and exact description.

The object of the invention is to provide a new and improved adding machine, which is simple and durable in construction and arranged to enable the operator to perform the arithmetical operation of adding, in a very simple and accurate manner by mechanical means.

The invention consists of a fixed dial plate having segmental slots of varying length, a wheel mounted to turn under the said dial plate and adapted to be turned beneath the said slots by the insertion of a suitable tool, and a slide carrying a pointer and actuated from the said wheel, the said slide indicating the hundreds on the fixed dial plate.

The invention also consists of certain parts and details, and combinations of the same, as will be hereinafter described and then pointed out in the claims.

Reference is to be had to the accompanying drawings, forming a part of this specification, in which the same letters and numerals of reference indicate the same or corresponding parts in all the figures.

Figure 3:
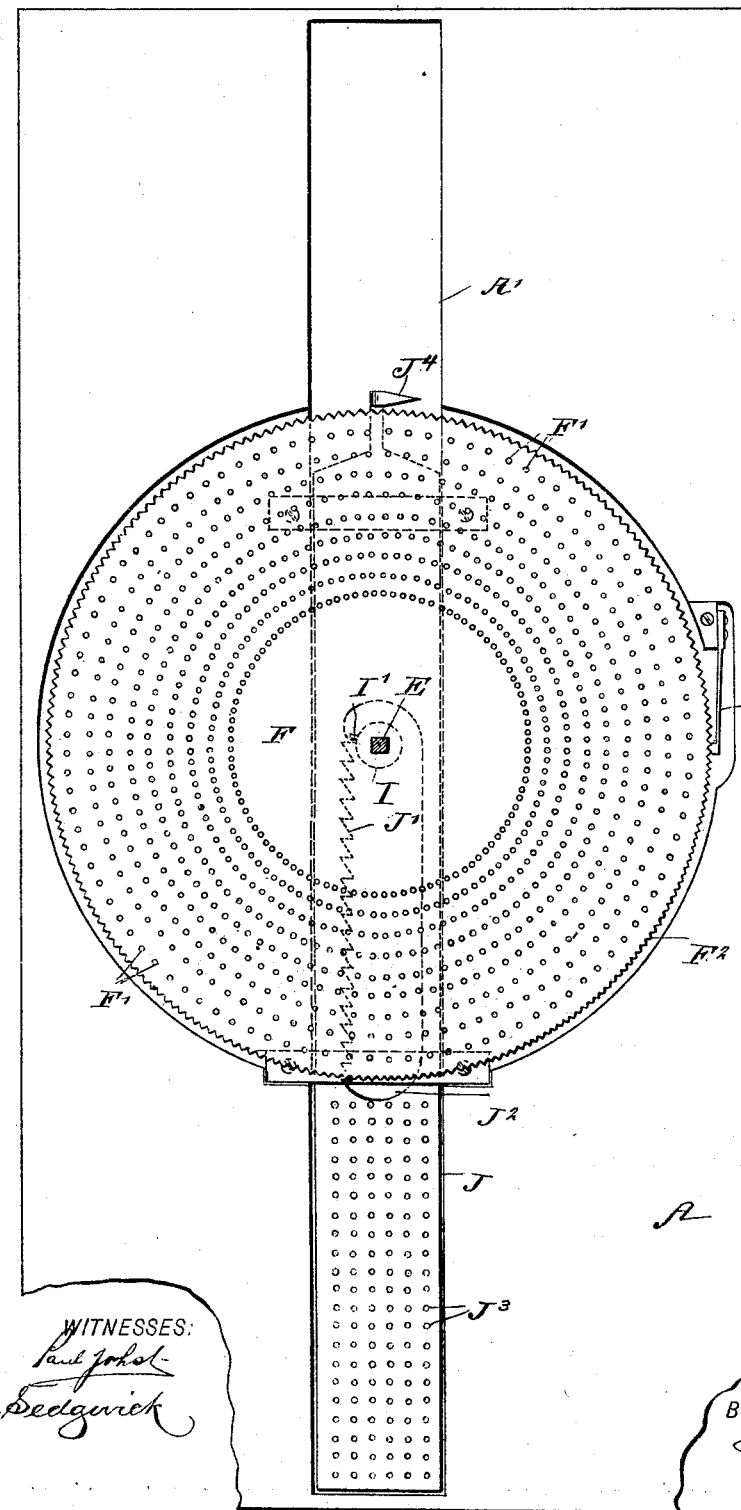
Figure 4:
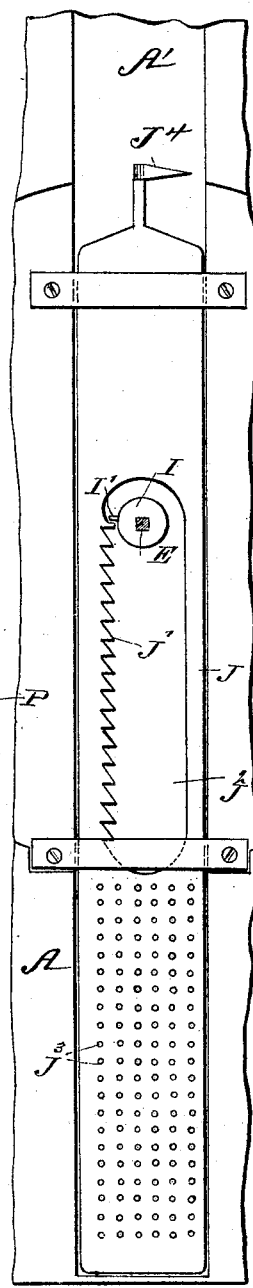

Figure 1 is a plan view of the improvement. Fig. 2 is a sectional side elevation of the same on the line 2—2 of Fig. 1. Fig. 3 is a plan view of the same with the dial plate removed; and Fig. 4 is a plan view of the slide and adjacent parts.

The improved adding machine is provided with a suitably constructed casing A covered at the top by a fixed dial plate B on which is arranged in a circle, the consecutive numbers C ranging from 1 to 100. On these numbers indicates a pointer D, secured fixedly on the upper end of a shaft E mounted to turn in suitable bearings formed in the bottom of the casing A and the fixed dial plate B, as will be readily understood by reference to Fig. 2. On this shaft E directly under the dial plate B is secured fixedly a wheel F (see Fig. 3) formed in its top surface with circular rows of apertures or recesses F', adapted to be engaged by the pointed end of a tool G made in the form of a rod, as indicated in Fig. 2. The end of this tool is adapted to be passed through segmental slots H formed in the dial plate B and arranged concentric with each other, the center being in the axis of the shaft E. See Fig. 1. These segmental slots H are of different length, so that when the tool G is passed through one of the slots at the numbered end thereof as seen in Fig. 1 to engage the corresponding recess F', in the wheel F, and then the tool G is moved to turn the wheel F until the pointed end of the tool strikes the other end of the said slot, then the pointer D held on the shaft of the said wheel, indicates on the numbers C the amount represented by the length of the slot H, since the wheel F, the shaft E, and the pointer D move together. Thus, for instance, if the operator inserts the tool G in the slot H marked 10 (see Fig. 1), at the numbered end of the said slot and moves the tool in the direction of the arrow $a'$, until the tool is at the other end of the slot, the wheel F is turned, so that the pointer D moves from 1 to 10. In a like manner, if the tool is inserted at the numbered end of the slot 90 and moved through the entire length thereof, then the pointer D will move forward ninety points from the previous position (that is, 10) so that the pointer will stand at 100.

On the shaft E directly under the wheel F is arranged a collar I formed with a tooth I' adapted to engage one of the teeth of a rack J' formed in a slide J mounted to slide in suitable recess A' formed in the casing A. See Figs. 3 and 4.

On the upper end of the slide J is held a pointer $J^4$, which extends through a straight slot B' formed in the dial plate B, as shown in Fig. 1. The pointer $J^4$ indicates on the top surface of the dial plate B on a column N containing numerals ranging from 100 to 2,000 and indicating the hundreds column. Thus, when the wheel F makes one complete revolution, the tooth I' moves the slide J the distance between two of its teeth on the rack J', whereby the pointer J⁴ is moved from one numeral to the next higher 100 numeral in the column N.

In the lower end of the slide J are arranged rows of apertures J³ adapted to be engaged by the pointed end of the tool G, the point of the latter being inserted through parallel slots O formed in the dial plate and extending lengthwise, as plainly indicated in Fig. 1. The slots O are of different lengths and represent hundreds, so that when the tool is inserted through one of the slots, say the one marked 9 at the lower end thereof, and moved forward in the direction of the arrow b', to shift the slide J in the same direction, until the end of the slot is reached, then the pointer J⁴ has advanced nine hundred on the column N.

In order to prevent the wheel F from being rotated too far, I provide the periphery with serrations or teeth F² engaged by a spring pawl P, secured on the casing A, as shown in Fig. 3.

The operation is as follows: When the device is in the position shown in Fig. 1, and the pointer D indicates 1 on the numbers C with the other pointer J⁴ at 0, and the operator desires to add, say, first twenty, he inserts the tool G through the slot H marked 20, at the numbered end thereof, to engage a corresponding aperture F' in the wheel F, and moves the tool G to the other end of the said slot H, to turn the wheel F, so that the pointer D moves to the numeral 21 in the circle of numbers C. The next amount to be added is, say ninety; the operator then repeats the operation and inserts the tool G at the numbered end of the circular slot H marked 90, as above described, so that the wheel F is again turned and ninety is added to the twenty-one, whereby the pointer D moves from the 21 in the direction of the arrow a' until it stops at 11, and at the same time the pointer J⁴ advances from its 0 position to 100 by the action of the tooth I' on the slide J, the latter being moved forward the distance between two teeth of the rack J' to shift the pointer J⁴ as above mentioned. Thus, the two pointers J⁴ and D indicate 111, which is the total sum of the two numbers added. Now, if the operator is to add, say eight hundred, he inserts the tool G in the slot O marked 8, at the lower end of the said slot to engage one of the apertures J³ and then moves the tool forward in the direction of the arrow b', to the other end of the slot 8, so that the slide J moves in the direction of the arrow b', to move the pointer J⁴ to 900 in the column N; the sum total is then nine hundred and eleven.

It will be seen that this device is very simple in construction, can be readily manipulated and requires no mental calculation whatever on the part of the operator, to add up any desired sum.

Having thus fully described our invention, we claim as new and desire to secure by Letters Patent—

1. An adding machine, comprising a rotatable wheel, a pointer adapted to rotate therewith and indicate numbers on a suitable dial, and a stationary plate essentially parallel to the wheel and having segmental slots of varying lengths, a separate number corresponding to each of the slots, the wheel being adapted to be turned by means of a tool inserted through the said segmental slots, substantially as described.

2. An adding machine, comprising a rotatable wheel, a pointer adapted to rotate therewith and indicate numbers on a suitable dial, and a stationary plate essentially parallel to the wheel and having segmental slots of varying lengths, a separate slot corresponding to each number of units and tens, the wheel being adapted to be turned by means of a tool inserted through the said segmental slots, substantially as described.

3. An adding machine, comprising a rotatable wheel, a pointer fixedly connected therewith, a stationary dial plate on which said pointer is adapted to indicate, the said plate having segmental slots of varying lengths, each slot corresponding to a single number, a slide and means for moving the same a definite distance at each complete turn of the wheel, and a pointer rigidly connected with the said slide and adapted to indicate on the fixed dial plate, said plate being also provided with straight slots of varying lengths in registry with the said slide, each slot corresponding to a single number, the wheel and the slide being adapted to be operated by means of a tool inserted through the slots, substantially as described.

4. An adding machine, comprising a rotatable wheel, a pointer rigidly connected therewith, a fixed dial plate on which the pointer indicates, the said dial plate having segmental slots of varying lengths, a separate slot corresponding to each number of units and tens, a collar mounted to turn with the said wheel and provided with a tooth, a slide provided with a rack in the path of travel of the said tooth, a pointer rigidly connected with the slide and indicating on a hundreds column of the dial plate, the latter being also provided with straight slots of varying lengths extending longitudinally over the said slide, each of these slots corresponding to a single number of hundreds, the wheel and the slide being adapted to be operated by means of a tool inserted through the said segmental and straight slots respectively, substantially as described.

5. An adding machine, comprising a rotatable wheel provided with concentric rows of apertures, a pointer rigidly connected with the said wheel, a fixed dial plate on which the pointer indicates, the said dial plate having segmental slots of varying lengths in registry with the rows of apertures of the said wheel, each slot corresponding to a single number, a slide having straight rows of apertures, means for moving the slide a definite distance at each complete turn of the wheel, and a pointer rigidly connected with the said slide and adapted to indicate on the fixed dial plate, the latter being also provided with straight slots of varying lengths in registry with the rows of apertures of the said slide, the wheel and the slide being adapted to be operated by means of a tool inserted through the said segmental and straight slots respectively, substantially as described.

LEVI C. DALTON.
GEORGE C. MYATT.

Witnesses:
R. C. MURRAY,
T. J. COOPER.